United States Patent
Singer et al.

(10) Patent No.: US 6,209,312 B1
(45) Date of Patent: Apr. 3, 2001

(54) ROCKET MOTOR NOZZLE ASSEMBLIES WITH EROSION-RESISTANT LINERS

(75) Inventors: Victor Singer, Newark, DE (US); Clyde E. Carr, Jr., New London, PA (US)

(73) Assignee: Cordant Technologies Inc, Salt Lake City, UT (US)

( * ) Notice: Subject to any disclaimer, the term of this patent is extended or adjusted under 35 U.S.C. 154(b) by 0 days.

(21) Appl. No.: 09/288,330

(22) Filed: Apr. 8, 1999

Related U.S. Application Data
(60) Provisional application No. 60/081,184, filed on Apr. 9, 1998.

(51) Int. Cl.$^7$ .................................................. F02K 1/00
(52) U.S. Cl. ........................................ 60/271; 239/265.11
(58) Field of Search ....................... 60/271; 239/265.11, 239/397.5, 591

(56) References Cited

U.S. PATENT DOCUMENTS

| | | | |
|---|---|---|---|
| 2,987,874 | 6/1961 | Nicholson | 60/35.6 |
| 3,048,972 | * 8/1962 | Barlow | 60/271 |
| 3,137,995 | 6/1964 | Othmer et al. | 60/35.6 |
| 3,165,864 | 1/1965 | Shulze | 50/464 |
| 3,189,477 | 6/1965 | Shaffer | 117/46 |
| 3,194,013 | 7/1965 | Dagneau et al. | 60/35.6 |
| 3,200,585 | 8/1965 | Climent et al. | 60/35.6 |
| 3,226,929 | 1/1966 | McKenna | 60/35.6 |
| 3,228,186 | 1/1966 | Allen | 60/35.6 |
| 3,261,558 | 7/1966 | Davies | 239/601 |
| 3,545,679 | * 12/1970 | McAllister | 239/265.15 |
| 3,723,214 | 3/1973 | Meraz, Jr. | 156/87 |
| 3,762,644 | * 10/1973 | Mikeska | 239/127.1 |
| 4,477,024 | 10/1984 | O'Driscoll et al. | 239/265.11 |
| 4,729,512 | * 3/1988 | Laing | 239/265.11 |
| 4,917,968 | 4/1990 | Tuffias et al. | 428/621 |
| 5,263,349 | 11/1993 | Felix et al. | 72/38 |
| 5,802,842 | * 9/1998 | Hook et al. | 60/271 |

OTHER PUBLICATIONS

Singer et al., Benchmark Issues in Design of Metal High–Performance Pressure Vessels, Mar. 1998, p. 12.
Singer et al., "Application of Fracture Mechanics In Design and Analysis Of Pressure Vessels", Engineering Fracture Mechanics, 1969, vol. 1, pp. 507–517.

* cited by examiner

Primary Examiner—Charles G. Freay
(74) Attorney, Agent, or Firm—Sullivan Law Group

(57) ABSTRACT

A nozzle assembly including a nozzle structure and liner is disclosed. The nozzle structure is made of at least one carbon-based material and includes a nose tip region, a restricted cross-sectional throat region, and an exit cone region that collectively provide an interior surface configured to define a converging-diverging pathway. The liner includes leg and body portions. The leg portion protrudes over an edge or into a groove of the nozzle structure to engage the liner to the nozzle structure. The body portion of the liner covers at least the throat region of the nozzle structure along the flow path to obstruct high temperature combustion products from causing recession of the nozzle structure. The erosion-resistant liner has at least one irregularity that extends, in a continuous manner, radially at least along the leg portion and, optionally, longitudinally along the body portion. The irregularity is constructed and arranged to permit thermal deformation of the liner in response to thermally induced hoop stresses encountered in the nozzle structure during motor operation so as to reduce or eliminate thermal fracturing of the liners. Suitable irregularities include, by way of example, clearances in a circumferentially discontinuous liner.

24 Claims, 3 Drawing Sheets

ROCKET MOTOR NOZZLE ASSEMBLIES WITH EROSION-RESISTANT LINERS

RELATED APPLICATION

Priority is claimed based on provisional application 60/081,184 filed in the U.S. Patent & Trademark Office on Apr. 9, 1998, the complete disclosure of which is incorporated herein by reference.

GOVERNMENT LICENSE RIGHTS

The U.S. Government has a paid-up license in this invention and the right in limited circumstances to require the patent owner to license others on reasonable terms as provided for by the terms of contract no N60921-95-C0032 awarded by the Department of the Navy.

BACKGROUND OF THE INVENTION

1. Field of the Invention

This invention relates to a rocket motor nozzle assembly designed to reduce nozzle recession, especially for rocket motor nozzle assemblies comprising carbon-based materials.

2. Description of the Related Art

One factor taken into consideration in nozzle design is the configuration of the divergent/convergent pathway defined by the nozzle, and the restrictive orifice or throat area of the nozzle. Mass flow through the nozzle produces the force or thrust produced by the rocket motor. The proportions of the mass flow pathway, particularly the ratio of area at the exit plane to area at the throat, establish how efficiently the nozzle converts pressure in the mass flow stream to thrust produced by the motor. It is within the purview of those skilled in the art to design a nozzle to optimize the ratio of exit area to throat area.

Another factor taken into consideration in nozzle design is the weight penalty imparted to the rocket motor by the nozzle assembly. Intuitively, a lesser weight nozzle assembly is desirable because the lesser the weight of the nozzle assembly, the farther the rocket motor assembly can travel. For this reason, carbon-based materials are highly advantageous for use as nozzle insulation due to their low weight. As referred to herein, carbon-based materials include, but are not limited to, carbon or graphite bulk and composite materials with constituents previously subject to carbonization or graphitization, known as carbon/carbon, graphite/carbon, and cloth, fiber, or powder-filled phenolic composites, and also a large array of metal or silicon carbides.

It is widely acknowledged in the industry, however, that carbon-based nozzle throats tend to recede, especially at high operating temperatures and pressures. Studies have identified several reasons for nozzle throat recession. One among several reasons involves oxidation reactions between the carbon-based nozzle material and oxygen-containing constituents of the combustion products. As the propellant in the rocket motor burns, the carbon-based nozzle is exposed to the hot combustion gases, such as $O_2$, $H_2O$, $CO_2$, and NO. These gases, especially water and carbon dioxide, tend to react with the carbon-based nozzle materials to produce carbon monoxide gas, which is carried off with the discharged combustion products. Another reason for nozzle throat erosion is the abrasive impact of high velocity particles in the gas stream against the nozzle throat. Still another reason for nozzle throat recession involves pyrolysis of the throat material itself, particularly when volatile decomposition products form.

The recession of the nozzle throat inner surface during motor operation is a source of several problems in rocket operation. As the nozzle throat material recedes, the exit area to throat area ratio (or expansion ratio) diminishes, thereby decreasing the efficiency of the nozzle. Additionally, rough nozzle surfaces, which tend to form during nozzle recession, have been shown to undergo recession at faster rates than smooth surfaces. Thus, the nozzle throat recession process can be characterized as a self-perpetuating phenomenon. Another problem attributable to nozzle recession is a loss of predictability. Calculations for determining acceptable payloads and requisite propellant grain stocks must be accurate to ensure that the rocket will reach its intended target. The calculations necessary for ascertaining rocket dimensions and payloads are dependent upon many variables, including nozzle throat dimension. In-flight variations of nozzle throat dimension due to recession can significantly complicate, if not render impossible, precise motor performance calculations.

To address the shortcomings of carbon-based nozzle throats, refractory metal and metal alloys are occasionally used in spite of their high specific gravities. Examples of such materials are tungsten and its alloys.

However, the weight penalty and expense associated with the presence of the tungsten and other refractory metals often make these refractory materials impractical and uneconomical for applications involving bulky throat insert cross-section sizes. Additionally, such cross sections are subject to tensile and compressive stresses due to thermal shock early in motor burn when thermal expansions near the rapidly heated exposed surfaces are restrained by cooler regions of the cross section farther from the exposed surfaces. Indeed, surface heating can be so intense that temperature gradients of thousands of degrees per inch are possible. Such thermal stresses in both the axial and tangential (or hoop) directions can produce thermal fractures in the nozzle component, and potentially ejection from the motor.

Refractory ceramic materials have also occasionally been used in an attempt to address the shortcomings of carbon-based nozzles. Refractory ceramics present lesser weight penalties than refractory metals, but thermal shock penalties may be greater than in refractory metals.

To address the problem of restrained thermal deformations, U.S. Pat. No. 3,200,585 to Climent et al., the complete disclosure of which is incorporated herein by reference, discloses the use of a plurality of tungsten washers as constituting the throat portion of a nozzle, with the washers being stacked to form a cylindrical structure. The washers include radially extending slits to permit expansion and contraction of the washers in response to thermal stresses. However, the tubular structure disclosed by Climent et al. has several drawbacks. For example, the tubular structure is disposed only in the throat region of the nozzle pathway, leaving other portions of the pathway, such as the nosetip, entrance, and susceptible exit regions of the pathway, unprotected. Additionally, tungsten is chemically reactive with carbon-based insulation or substrate. As a consequence, the tungsten and carbon-based portions are prone to recession. Finally, the mounting of the tungsten washers and their support member can be a laborious and time-consuming process.

It would, therefore, be a significant advancement in the art to provide a nozzle assembly that takes advantage of the low weight of carbon-based materials and the erosion resistance of metals and alloys, yet does not impose an undue weight penalty to the rocket motor assembly and avoids nozzle recession and its associated problems.

SUMMARY OF THE INVENTION

It is, therefore, an object of this invention to provide a rocket motor assembly that accomplishes the above-mentioned improvement in the art.

In accordance with the principles of this invention, these and other objects are attained by the provision of a nozzle assembly mountable to a rocket motor body to form part of a rocket motor assembly for receiving and discharging high temperature combustion products from a combustion chamber of the rocket motor body. In accordance with an embodiment of this invention, the nozzle assembly includes at least a mount structure adapted for mounting of the nozzle assembly to the rocket motor body, a converging-diverging nozzle structure associated with the mount structure and comprised of at least one carbon-based material, and one or more erosion-resistant liners. The nozzle structure comprises a nose tip region, a restricted cross-sectional throat region, and an exit cone region that collectively provide an interior surface configured to define a converging-diverging flow path through which the combustion products pass during operation of the rocket motor assembly. Each of the liners comprises at least one leg portion and a corresponding body portion angled relative to the leg portion. Each of the leg portions of the liners protrudes into an edge or groove of the nozzle structure to engage the liner to the nozzle structure. The body portions of the liners collectively cover the throat region and optionally the nose tip region of the nozzle structure along the flow path, as well as the exit cone region along sections of the flow path that are prone to more than negligible amounts of recession. In this manner, the body portions of the liners obstruct high temperature combustion products from coming into sufficient contact with the nozzle structure to cause the underlying nozzle structure to recede during operation of the rocket motor assembly.

The erosion-resistant liners each have at least one irregularity that extends, in a continuous manner, radially along the leg portion and, optionally, longitudinally along the body portion of the liner. The irregularity is or irregularities are constructed and arranged to permit rather than restrain thermal deformation of the liners in response to non-uniform heating of the nozzle structure during motor operation so as to reduce (compared to had the irregularities not been present) or eliminate fracturing of the liners which can occur when the deformations are restrained. Suitable irregularities include, by way of example, clearances formed from a circumferentially discontinuous liner, and/or protrusions or corrugations extending across the liners.

The inventive nozzle assemblies may be applied to various kinds and types of rocket motors having one-time burn or multiple-burn duty cycles. Representative rocket motors in which the inventive nozzle assemblies can be applied include, by way of example, satellite propulsion motors, tactical motors, and divert/attitude control motors.

These and other objects, features, and advantages of the present invention will become apparent from the following detailed description of the invention when taken in conjunction with the accompanying drawings which illustrate, by way of example, the principles of this invention.

BRIEF DESCRIPTION OF THE DRAWINGS

The accompanying drawings are presented for the purpose of elucidating the principles of this invention. In the drawings.

DETAILED DESCRIPTION OF THE INVENTION

Figure 7:
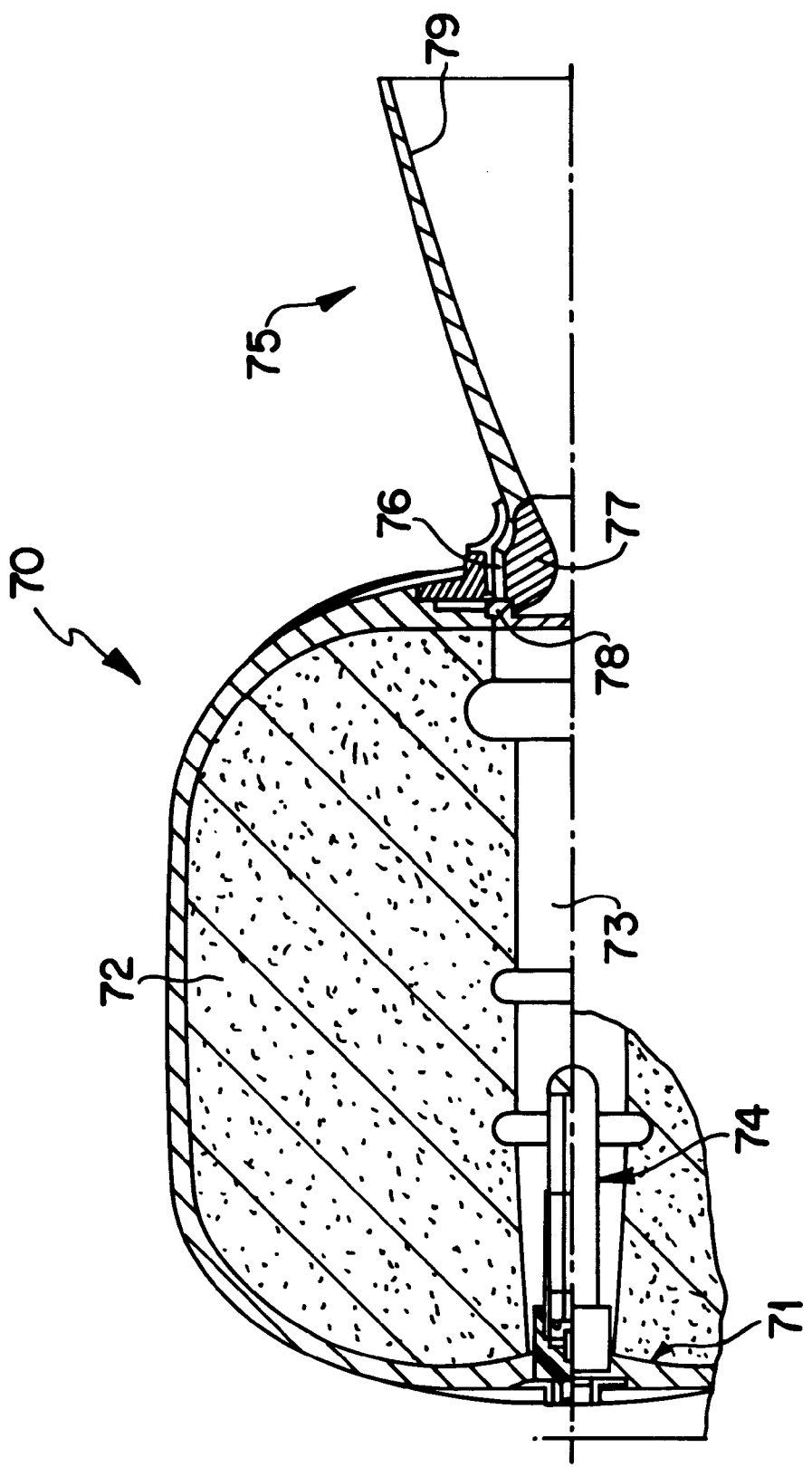
FIG. 7 is a schematic depicting in cross-sectional view a rocket motor having a conventional rocket nozzle to which the liner of the present invention is capable of being applied.

Referring now more particularly to the drawings, there is shown in FIG. 7 a conventional rocket motor assembly, generally designated by reference numeral 70, which a skilled artisan having reference to this disclosure could modify to include the inventive nozzle liner. The rocket motor assembly 70 includes a case 71 enclosing a combustion chamber (unnumbered) substantially filled by center-perforated solid propellant grain 72. The case 71 and the solid propellant grain 72 are separated by a thin insulating layer (unnumbered). Centrally located within the forward end of the center perforation 73 of the propellant grain 72 of the rocket motor assembly 70 is an igniter assembly 74 for initiating burn of the solid propellant grain 72 along the center perforation 73.

The center perforation 73 of the solid propellant grain 72 is in fluid communication with a nozzle assembly, which is generally designated by reference numeral 75. The nozzle assembly 75 is mounted to the case 71 by a mount structure 76, which in the illustrated embodiment includes, among other things, a closure module, an aft polar boss, and insulation. The nozzle assembly 75 includes a throat region 77, a nose tip region 78 arranged forward of the throat region 77, and an exit cone region 79 extending aftward from the throat region 77. The nose tip region 78, throat region 77, and exit cone region 79 collective define a converging-diverging flow path or pathway.

In operation, the solid propellant grain 72 is ignited by the igniter assembly 74, producing combustion products that flow from the combustion chamber into the nozzle assembly 75 and through the nose tip region 78 and the throat region 77, before being expelled through the diverging exit cone region 79.

Figure 1:
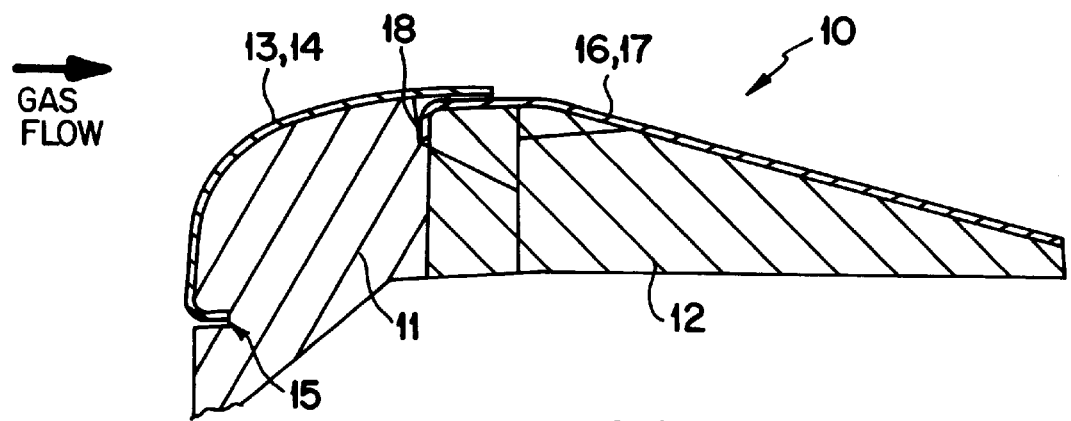
FIG. 1 is a schematic depicting in cross-sectional view a portion of a rocket nozzle having liners with radial irregularities formed therein.

The inventive nozzle assembly is shown in FIG. 1 and generally designated by reference numeral 10. The nozzle assembly includes a carbon-based shell structure comprised of forward annular region 11 and aft annular region 12. Representative materials for making the carbon-based structure include, by way of example, carbon/carbon composites, graphite/carbon composites, phenolics, and other known materials that are prone to nozzle recession.

Extending over the pathway defining surface of region 11 is a body portion 14 of forward liner 13. The body portion 14 of the liner 13 covers the nose tip region and part of the throat region along he flow path. The aft annular region 12 has its pathway-defining surface covered by a body portion 17 of an aft liner 16. The body portion 17 covers part of the throat region, overlapping with body region 14. The body portion 17 also covers a section of the exit cone region that is prone to more than a negligible amount of recession. As referred to herein, a negligible amount of recession means recession that is sufficiently small as to not affect the impulse of the rocket motor (the product of thrust and time over the burn duration) significantly mean. In this sense, a significant effect is one that is a greater burden than the cost of eliminating the burden, if the burden can be eliminated. By collectively extending over the shell structure along the flow path, the body portions 14 and 17 of liners 13 and 16 obstruct high temperature combustion products from coming into sufficient contact with the carbon-based material of the shell structure and causing the recession of the shell structure during rocket motor assembly operation.

The forward liner 13 also includes a leg portion 15 received at an edge of the forward annular region 11. Likewise, the aft liner 16 has a leg portion 18 received in a groove formed between the forward and aft annular regions 11 and 12. The placement of leg portions 15 and 18 in regions 11 and 12 serves to retain the liners 13 and 16 against the nozzle structure. Since no bonding agent or brazing technique is required between liners 13 and 16, the liners 13 and 16 are permitted to deform during motor operation to diminish or even eliminate the adverse effects of thermal stresses. Also, the connection provided by the leg portions 15 and 18 permit pyrolysis gases from regions 11 and 12 to escape, thereby preventing unwanted reactions and pressure build ups. It is understood that although bonding agents, brazing techniques, and the like are not use in a preferred embodiment, these agents and techniques are also not precluded from the scope of the invention. Additionally, known mechanical fasteners and techniques can be used.

Figure 2:
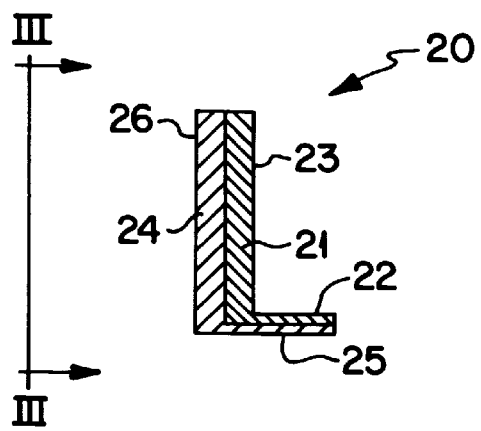
FIG. 2 is a schematic depicting in isolated cross-sectional side view a two-component liner in accordance with a first embodiment of the present invention, in which the irregularities are clearances.
Figure 3:
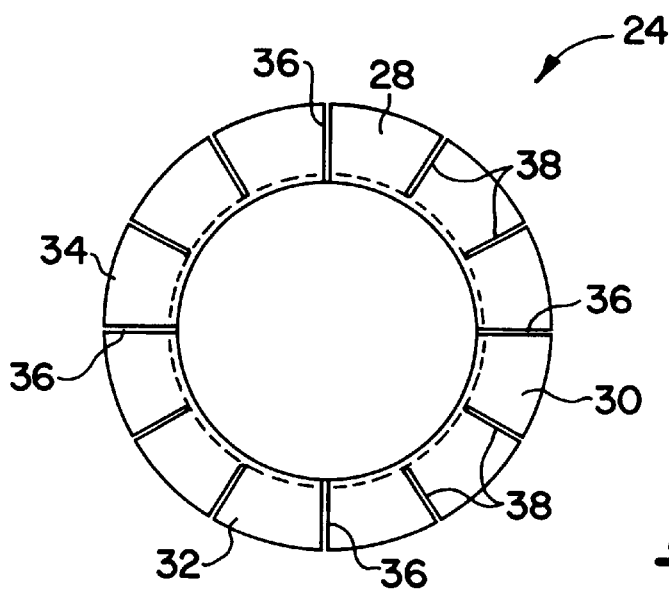
FIG. 3 is a schematic depicting in plan view a component of the liner illustrated in FIG. 2.

Referring now to FIGS. 2 and 3, there is shown a two-layer (or two-component) liner 20 in isolation in accordance with a first embodiment of this invention. The illustrated liner 20 comprises an outer layer or component 21 with an inner layer or component 24 nestled therein. The outer component 21 includes a substantially cylindrical body portion 22 and an annular flat leg portion 23, which is integrally formed with the body portion 22. Similarly, the inner component 24 includes a substantially cylindrical body portion 25 and an annular flat leg portion 26, which is integrally formed with the body portion 25. The outer diameter of the substantially cylindrical body portion 22 should be approximately the same, but slightly smaller than, the inner diameter of the substantially cylindrical body portion 25 to permit the outer component 21 to be nestled within the inner component 21.

FIG. 3 represents a plan view of the inner component 24 taken along line III—III in FIG. 2. As shown in FIG. 3, the inner component 24 is formed from four identical 90° segments 28, 30, 32, and 34, which are spaced from each other by irregularities in the form of clearances 36 to thereby collectively provide the component 24 with the configuration of a circumferentially discontinuous ring. Each of the component segments 28, 30, 32, and 34 has two radially extending slits 38 formed therein. The clearances 36 and slits 38 are arranged at 30° intervals. More specifically, as shown in FIG. 3, the clearances 36 are arranged at the 0°, 90°, 180°, and 270° positions, whereas the slits 38 are arranged at the 30°, 60°, 120°, 150°, 210°, 240°, 300°, and 330° positions. Similarly, the outer component 21 is preferably formed from four identical 90° segments having slits at 30° intervals, with the clearances and slits of the outer component 21 preferably being offset by 15° to the clearances and slits of the inner component 24. The offsetting of the clearances and slits of adjacent components 21 and 24 prevents gases from contacting the covered regions of the nozzle structure, thereby eliminating local erosion.

At least during the early stages of rocket motor operation, the substantially cylindrical body portions 22 and 25 will be hotter than the flat leg portions 23 and 26, and, therefore, will experience greater thermal expansion. The presence of radial clearances 36 and slits 38 reduces thermal stresses, especially hoop stresses, encountered in the liner components 21 and 24 during motor operation by permitting, rather than constraining, thermal expansion of the components 21 and 24.

Figure 4:
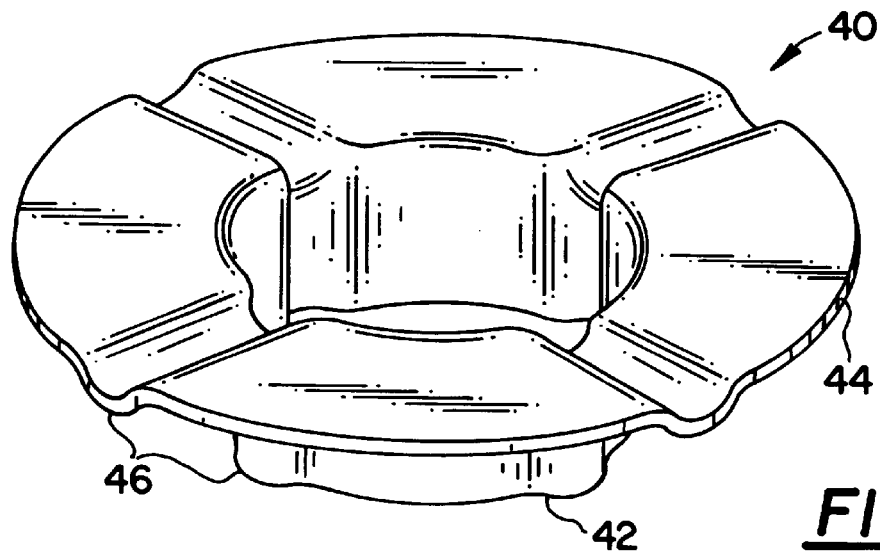
FIG. 4 is a perspective view of a liner in accordance with a second embodiment of this invention, in which the irregularities are grooves.
Figure 5:
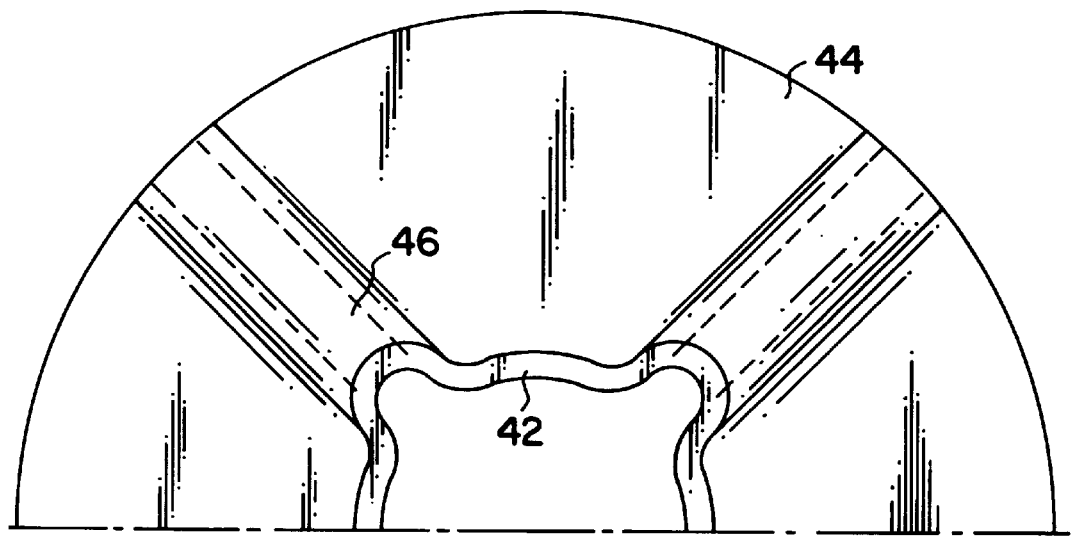
FIG. 5 is a schematic of a plan view of the liner of FIG. 4.
Figure 6:
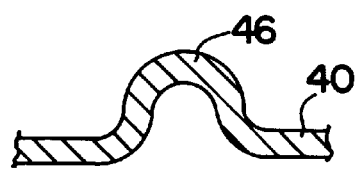
FIG. 6 is a sectional view of the a portion of the liner of FIGS. 4 and 5.

A liner in accordance with a second embodiment of the invention is illustrated in FIGS. 4–6. In the embodiment illustrated in FIGS. 4–6, the circumferentially continuous liner 40 has a substantially cylindrical body portion 42 and leg portion 44, which are angled relative to each other and integrally formed with each other. In contrast to the clearances shown in FIG. 3, the body and leg portions 42 and 44 of the liner 40 contain, as longitudinally-extending and radially-extending continuous irregularities, respectively, four channels (or creases) 46 spaced from each other by 90°. Although rounded channels are shown in the illustrated embodiment, especially in FIG. 6, it is understood that the channels could have planar sides, and that more than one channel could be arranged next to each other to define corrugations or other similar structures that are thermally deformable in response to hoop stresses.

As the liner 40 is subject to thermal stresses during rocket motor operation, the channels 46 permit the body and leg portions 42 and 44 of the liner 40 to thermally deform, thereby reducing or eliminating thermal fracturing of the liners. This embodiment is characterized by several advantages, including that a second layer may be omitted, since the presence of channels 46 does not interrupt the continuous structure of the liner. Also, the presence of only one layer, instead of a multi-component liner, is efficient from cost, weight, and volume considerations.

The thickness of the material should be smaller than the critical thickness at operation temperature so as to permit thermal deformation in response to hoop stresses. In this sense, "critical thickness" is infinitesimally larger than what would permit the material to be folded without fracture. For example, tungsten liners could have thicknesses as high as about 0.040 inch (about 0.10 cm).

Deep-draw and flow-form techniques, well known among those skilled in the art of metal forming, can be used for the components shown in FIGS. 2 and 3. Plasma spray deposition techniques for making the liner 40 are well known in the art. Machining (a group of metal removal techniques) is also well known for those skilled in the art. For these reasons, none of the above-mentioned techniques are described herein.

The liners are preferably made of materials resistant to erosion up to operating temperatures of at least 5000° F. (2760° C.), more preferably at least 5500° F. (3038° C.), still more preferably at least 6100° F. (3371° C.). The liner materials themselves need not have such temperature capabilities; instead, lesser temperature capabilities are permissible when mitigating conditions are present, such as, for example, when the supporting structure is an effective heat sink or when burn rate duration is short.

Representative materials from which the liners can be made include the following: tungsten; tungsten alloys, such as tungsten hafnium, tungsten tantalum, and tungsten rhenium; and refractory ceramics and fiber-reinforced ceramic composites using refractory metal compounds, such as carbides or nitrides of hafnium, tantalum, and zirconium, and borides of hafnium and zirconium. The inner and outer components of a liner can be made of the same or different materials. However, where tungsten is used as a material for forming a component of the liner, the liner is preferably of a multi-layered construction, with a component that is not chemically reactive with the carbon-based nozzle structure or the tungsten being interposed between the tungsten component and the nozzle structure to prevent reaction therebetween. Representative non-reactive component materials that can be used in combination with tungsten components include oxides or carbides of hafnium, tantalum, tungsten, rhenium, titanium, and zirconium.

In order to reduce or eliminate reaction between the tungsten and carbon-based region of the nozzle structure, the interior surface of the nozzle structure can be sprayed with rhenium, or the contacting surface of the tungsten layer can be oxidized.

The interface between the carbon-based shell structure and liners and the interface between components of liners can be filled with an adhesive. Representative adhesives include an epoxy adhesive composition, such as EA 934 available from Hysol.

As mentioned above, the inventive nozzle assemblies can be applied in various rocket motors, including, by way of example, in satellite propulsion motors, tactical motors, and divert/attitude control motors. In accordance with one contemplated use of the invention, the components of the liners have the following dimensions. The cylindrical body portions of the liner components can have a thickness in a range of from 10 mils to 60 mils (0.01 inches to 0.06 inches, or about 0.025 cm to about 0.15 cm). The thickness of the flat leg portions generally should not be smaller than that of the cylindrical body portion, but may be thicker than the body portions, particularly if the thickness of the body portion is towards the lower end of the above-mentioned range.

Various modifications and equivalent arrangements to those illustrated fall within the scope of the invention. For example, despite the depiction of two liners 13 and 16 in FIG. 1, it is understood that the entire pathway can be covered by only one liner, or by more than two liners.

Although in the embodiment illustrated in FIGS. 2 and 3 the liner 20 is formed from two nestled components 22 and 24, it is understood that the liner can be formed from a single component or more than two components. Additionally, while the illustrated embodiment includes four segments, each subtending an arc of about 90°, it is understood that more or fewer segments can be used, and that the segments may subtend different angles from each other. For example, the liners can be made of a single segment having ends opposing each other across a radial clearance, with radial slits optionally provided in the segment.

The foregoing detailed description of the embodiments of the invention has been provided for the purposes of illustration and description. It is not intended to be exhaustive or to limit the invention to the precise embodiments disclosed. The embodiments were chosen and described to best explain the principles of the invention and its practical application, thereby enabling others skilled in the art to understand the invention. While the invention has been described in connection with what is presently considered to be the most practical and preferred embodiments, it is understood that the invention is not limited to the disclosed embodiments. To the contrary, this invention is intended to cover various modifications and equivalent arrangements included within the spirit and scope of the appended claims.

We claim:

1. A nozzle assembly mountable to a rocket motor body to form part of a rocket motor assembly and constructed and arranged so that, during operation of the rocket motor assembly, said nozzle assembly receives high temperature combustion products from a combustion chamber of the rocket motor body and discharges the high temperature combustion products to propel and/or divert the rocket motor assembly, said nozzle assembly comprising:

a mount structure constructed and arranged to permit mounting of said nozzle assembly to the rocket motor body;

a nozzle structure associated with said mount structure and comprised of at least one carbon-based material, said nozzle structure comprising a nose tip region, a restricted cross-sectional throat region, and a exit cone region that collectively provide an interior surface configured to define a converging-diverging flow path through which the combustion products pass during operation of the rocket motor assembly with one or more edges and/or grooves formed in said interior surface; and one or more erosion-resistant liners respectively comprising at least one leg portion and a corresponding body portion angled relative to said corresponding leg portion, each of said leg portions protruding into respective ones of said edges or grooves of said nozzle structure to engage said liners to said nozzle structure, said body portion or body portions of said liners collectively covering at least said throat region so that said body portions obstruct the high temperature combustion products from coming into sufficient contact with said nozzle structure to cause said nozzle structure to recede during operation of the rocket motor assembly, wherein each of said liners have one or more irregularities extending radially along said leg portion, said irregularities constructed and arranged to permit thermal deformation of said liners in response to thermally induced hoop stresses encountered in said nozzle structure during motor operation so as to reduce or eliminate thermal fracturing of said liners.

2. The nozzle assembly of claim 1, wherein said liners comprise at least one tungsten alloy.

3. The nozzle assembly of claim 2, wherein said tungsten alloy is selected from the group consisting of tungsten rhenium, tungsten hafnium, and tungsten tantalum.

4. The nozzle assembly of claim 1, wherein said liners comprise at least one carbide of a refractory metal.

5. The nozzle assembly of claim 4, wherein said carbide is selected from the group consisting of hafnium carbide, tantalum carbide, and zirconium carbide.

6. The nozzle assembly of claim 1, wherein said liners comprise at least one boride of a refractory metal.

7. The nozzle assembly of claim 6, wherein said boride is selected from the group consisting of hafnium diboride and zirconium diboride.

8. The nozzle assembly of claim 1, wherein at least one of said liners comprises a plurality of stacked layers, an outermost one of said stacked layers being chemically inert with respect to said nozzle structure.

9. The nozzle assembly of claim 8, wherein one of said stacked layers that is radially inside of said outermost layer comprises tungsten.

10. The nozzle assembly of claim 1, wherein said irregularities are defined by circumferential discontinuities.

11. The nozzle assembly of claim 10, wherein said liners have one or more slits therein, each of said slits extending radially over a portion of said liners.

12. The nozzle assembly of claim 1, wherein said liners respectively comprise a plurality of circumferentially discontinuous segments collectively forming a ring with clearances defined between adjacent ones of said circumferentially discontinuous segments.

13. The nozzle assembly of claim 12, wherein said liners respectively comprise a plurality of stacked layers, an outermost one of said stacked layers being chemically inert with respect to said nozzle structure.

14. The nozzle assembly of claim 13, wherein said clearances of adjacent ones of said stacked layers are circumferentially staggered relative to each other.

15. The nozzle assembly of claim 14, further comprising at least one adhesive disposed in said clearances between said segments.

16. A nozzle assembly mountable to a rocket motor body to form part of a rocket motor assembly and constructed and arranged so that, during operation of the rocket motor assembly, said nozzle assembly receives high temperature combustion products from a combustion chamber of the rocket motor body and discharges the high temperature combustion products to propel and/or divert the rocket motor assembly, said nozzle assembly comprising:

a mount structure constructed and arranged to permit mounting of said nozzle assembly to the rocket motor body;

a nozzle structure associated with said mount structure and comprised of at least one carbon-based material, said nozzle structure comprising a nose tip region, a restricted cross-sectional throat region, and an exit cone region that collectively provide an interior surface configured to define a converging-diverging flow path through which the combustion products pass during operation of the rocket motor assembly with one or more edges and/or grooves formed in said interior surface; and one or more erosion-resistant liners respectively comprising at least one leg portion and a corresponding body portion angled relative to said corresponding leg portion, each of said leg portions protruding into respective ones of said edges or grooves of said nozzle structure to engage said liners to said nozzle structure, said body portion or body portions of said liners collectively covering said throat region and optionally said nose tip region along said flow path and said exit cone region along a section of said flow path that is prone to more than negligible amount of recession so that said body portions obstruct the high temperature combustion products from coming into sufficient contact with said nozzle structure to cause said nozzle structure to recede during operation of the rocket motor assembly, wherein each of said liners have one or more irregularities in the form of grooves extending radially along said leg portion and optionally longitudinally along said body portion, said irregularities constructed and arranged to permit thermal deformation of said liners in response to thermally induced hoop stresses encountered in said nozzle structure during motor operation so as to reduce or eliminate thermal fracturing of said liners.

17. The nozzle assembly of claim 16, wherein said liners comprise at least one tungsten alloy.

18. The nozzle assembly of claim 17, wherein said tungsten alloy is selected from the group consisting of tungsten rhenium, tungsten hafnium, and tungsten tantalum.

19. The nozzle assembly of claim 16, wherein said liners comprise at least one carbide of a refractory metal.

20. The nozzle assembly of claim 19, wherein said carbide is selected from the group consisting of hafnium carbide, tantalum carbide, and zirconium carbide.

21. The nozzle assembly of claim 16, wherein said liners comprise at least one boride of a refractory metal.

22. The nozzle assembly of claim 21, wherein said boride is selected from the group consisting of hafnium diboride and zirconium diboride.

23. The nozzle assembly of claim 16, wherein grooves extend longitudinally along said body portion.

24. The nozzle assembly of claim 16, wherein said liner covers said nose tip region.

\* \* \* \* \*